United States Patent
Zhao et al.

(10) Patent No.: US 11,203,112 B2
(45) Date of Patent: Dec. 21, 2021

(54) THREE-DEGREE-OF-FREEDOM PARALLEL MECHANISM

(71) Applicant: SHENZHEN INSTITUTES OF ADVANCED TECHNOLOGY, Shenzhen (CN)

(72) Inventors: Guoru Zhao, Shenzhen (CN); Yongfeng Wang, Shenzhen (CN)

(73) Assignee: SHENZHEN INSTITUTES OF ADVANCED TECHNOLOGY, Shenzhen (CN)

( * ) Notice: Subject to any disclaimer, the term of this patent is extended or adjusted under 35 U.S.C. 154(b) by 48 days.

(21) Appl. No.: 16/862,603

(22) Filed: Apr. 30, 2020

(65) Prior Publication Data

US 2020/0316770 A1   Oct. 8, 2020

Related U.S. Application Data

(63) Continuation of application No. PCT/CN2017/118208, filed on Dec. 25, 2017.

(51) Int. Cl.
*B25J 9/00* (2006.01)
*F16C 7/02* (2006.01)

(52) U.S. Cl.
CPC ............. *B25J 9/003* (2013.01); *B25J 9/0054* (2013.01); *F16C 7/02* (2013.01)

(58) Field of Classification Search
CPC ........ B25J 9/003; B25J 9/0045; B25J 9/0048; B25J 9/0054; B25J 9/0063; B25J 9/06;

(Continued)

(56) References Cited

U.S. PATENT DOCUMENTS 4,683,406 A * 7/1987 Ikeda ................... B25J 17/0258
                                                    318/568.2
4,990,050 A * 2/1991 Tsuge ...................... B23Q 1/54
                                                    414/735

(Continued)

FOREIGN PATENT DOCUMENTS

CN         1799788 A  *  7/2006
CN       101292935 A  *  10/2008

(Continued)

OTHER PUBLICATIONS

International Search Report issued in corresponding International application No. PCT/CN2017/118208, dated Sep. 20, 2018.

(Continued)

*Primary Examiner* — Joseph Brown

(57) ABSTRACT

A three-degree-of-freedom parallel mechanism, includes a fixed platform, a movable platform, and three kinematic chains, where at least one of the three kinematic chains is a flexible chain; and the flexible chain includes a first connecting rod, a second connecting rod, and an axis-variable revolute pair, the axis-variable revolute pair includes a fixed member, a movable member, and a spherical pair, one end of the fixed member is fastened on the fixed platform, the other end of the fixed member fits and abuts against an inclined surface of the movable member, the spherical pair is accommodated in the fixed member, a spherical hinge connecting rod of the spherical pair penetrates the movable member, the first connecting rod is rotatably connected to the spherical hinge connecting rod and the second connecting rod, and the second connecting rod is spherically hinged to the movable platform.

6 Claims, 3 Drawing Sheets

(58) Field of Classification Search
CPC ......... F16C 11/0623; Y10T 403/32196; Y10T 403/32672; Y10T 403/32786; Y10T 403/32803
USPC .................................. 74/490.05; 901/15, 28
See application file for complete search history.

(56) References Cited

U.S. PATENT DOCUMENTS

| | | | | |
|---|---|---|---|---|
| 4,997,413 | A * | 3/1991 | Dahlquist | B25J 17/025 475/163 |
| 5,752,834 | A * | 5/1998 | Ling | G09B 9/12 434/55 |
| 6,871,563 | B2 * | 3/2005 | Choset | B25J 9/102 74/490.01 |
| 2013/0061710 | A1 * | 3/2013 | Long | F16C 11/08 74/490.05 |
| 2015/0047452 | A1 * | 2/2015 | Wolf | B25J 17/00 74/490.05 |
| 2015/0239082 | A1 * | 8/2015 | Krouglicof | H02K 41/0356 248/346.01 |

FOREIGN PATENT DOCUMENTS

| | | | |
|---|---|---|---|
| CN | 102631275 | A * | 8/2012 |
| CN | 103522279 | A | 1/2014 |
| CN | 103878766 | A | 6/2014 |
| CN | 105459088 | A | 4/2016 |
| CN | 107009345 | A | 8/2017 |
| DE | 2449364 | A1 | 4/1976 |
| JP | 2004017266 | A | 1/2004 |
| KR | 101790945 | B1 * | 10/2017 |

OTHER PUBLICATIONS

Written Opinion of the International Searching Authority for No. PCT/CN2017/118208.

* cited by examiner

THREE-DEGREE-OF-FREEDOM PARALLEL MECHANISM

TECHNICAL FIELD

The present invention relates to the mechanical field, and specifically, to a three-degree-of-freedom parallel mechanism.

BACKGROUND

Since it was first put forward in 1938, the parallel robot has been widely applied to various fields in the society because the parallel robot features high rigidity, a high bearing capacity, a small error, high precision, a small deadweight-load ratio, good dynamic performance, easiness in control, and the like. Currently, common parallel mechanisms include a two-degree-of-freedom parallel mechanism, a three-degree-of-freedom parallel mechanism, a four-degree-of-freedom parallel mechanism, and a six-degree-of-freedom parallel mechanism. The three-degree-of-freedom parallel mechanism is the most studied and widely applied type of parallel mechanism with only a few degrees of freedom. Three-degree-of-freedom parallel mechanisms can be classified into four types based on a type of a degree-of-freedom of a movable platform: a parallel mechanism with three rotational degrees of freedom, a parallel mechanism with two rotational degrees of freedom and one translational degree of freedom, a parallel mechanism with one rotational degree of freedom and two translational degrees of freedom, and a parallel mechanism with three translational degrees of freedom.

Professor Liu Gengqian et al. from Hebei University of Technology put forward an anklebone rehabilitation robot (CN200810052248.7). The anklebone rehabilitation robot has the same model as an anklebone rehabilitation robot put forward by Zhao Tieshi from Yanshan University and an anklebone rehabilitation robot put forward by Dai Jiansheng et al, from University of London. Each of the anklebone rehabilitation robots is a 3-RSS/S three-degree-of-freedom parallel mechanism. The parallel mechanism includes four kinematic chains. A lower end of an intermediate kinematic chain is fastened on a fixed platform, and an upper end of the intermediate kinematic chain is connected to the center of a movable platform by using a spherical hinge. The three other kinematic chains are evenly distributed in the circumferential direction. One end of a drive connecting rod is connected to the fixed platform by using a revolute pair, and the other end of the drive connecting rod is connected to a driven connecting rod by using a spherical pair. One end of the driven connecting rod is connected to the movable platform by using a spherical hinge. The mechanism can rotate with three degrees of freedom around the center of a spherical hinge of the intermediate kinematic chain.

Wang Yongfeng et al. from Shenzhen Institutes of Advanced Technology put forward an anklebone rehabilitation robot (CN102631275A). The parallel mechanism is a 3-(HS)S/S three-degree-of-freedom parallel mechanism. The parallel mechanism also includes four kinematic chains. A lower end of an intermediate kinematic chain is fastened on a fixed platform, and an upper end of the intermediate kinematic chain is connected to the center of a movable platform by using a spherical hinge. The three other kinematic chains are evenly distributed in the circumferential direction. Lower ends of the three kinematic chains are connected to the fixed platform by using a helical pair. An angle between an axis of the helical pair and the fixed platform can be adjusted. In addition, one end of a support connecting rod is connected to a slider on the helical pair by using a spherical hinge, and the other end of the support connecting rod is connected to the movable platform by using a spherical hinge. The mechanism can rotate with three degrees of freedom around the center of a spherical hinge of the intermediate kinematic chain.

In these three-degree-of-freedom parallel mechanisms, a kinematic pair of the chain is a standard kinematic pair. For example, an axis of a revolute pair always remains unchanged in the motion process, which is unfavorable to transmission of force and torque of the kinematic chain. In addition, it is difficult to avoid singularities of the mechanism because the standard kinematic pair has a fixed kinematic axis.

SUMMARY

Embodiments of the present invention relate to a three-degree-of-freedom parallel mechanism, to overcome at least some of disadvantages in the prior art.

The embodiments of the present invention relate to a three-degree-of-freedom parallel mechanism, including a fixed platform and a movable platform, where the fixed platform is connected to the movable platform by using a first kinematic chain, a second kinematic chain, and a third kinematic chain that are connected in parallel, and at least one of the first kinematic chain, the second kinematic chain, and the third kinematic chain is a flexible chain; and the flexible chain includes a first connecting rod, a second connecting rod, and an axis-variable revolute pair, the axis-variable revolute pair includes a fixed member, a movable member, and a spherical pair, one end of the fixed member is fastened on the fixed platform, the other end of the fixed member fits and abuts against an inclined surface of the movable member, the spherical pair is accommodated in the fixed member, a spherical hinge connecting rod of the spherical pair penetrates the movable member, the first connecting rod is rotatably connected to the spherical hinge connecting rod and the second connecting rod, and the second connecting rod is spherically hinged to the movable platform.

In an embodiment, all of the first kinematic chain, the second kinematic chain, and the third kinematic chain are flexible chains, and connection points between the movable platform and three second connecting rods are annularly arranged on the movable platform.

In an embodiment, the three-degree-of-freedom parallel mechanism further includes an intermediate connecting rod, one end of the intermediate connecting rod is fastened on the fixed platform, and the other end of the intermediate connecting rod is spherically hinged to the movable platform.

In an embodiment, the first kinematic chain, the second kinematic chain, and the third kinematic chain are disposed around the intermediate connecting rod in the circumferential direction of the movable platform.

In an embodiment, each flexible chain is connected to a drive unit, and the drive unit is connected to a corresponding first connecting rod or second connecting rod.

In an embodiment, a cylindrical structure is formed when axes of the fixed member and the movable member coincide.

The embodiments of the present invention have at least the following beneficial effects:

In the flexible chain, when the first connecting rod drives the spherical hinge connecting rod to rotate, the inclined surface of the movable member is limited to rotate on an inclined surface of the fixed member due to the action of the inclined surface, and therefore an axis of the spherical hinge connecting rod changes in real time. In comparison with a kinematic chain with an ordinary revolute pair structure, in the present invention, the axis-variable revolute pair is incorporated into the structure of the kinematic chain. This is favorable to transmission of force and torque of the kinematic chain and can effectively avoid singularities of the parallel mechanism.

BRIEF DESCRIPTION OF DRAWINGS

To describe the technical solutions in the embodiments of the present invention or the prior art more clearly, the following briefly describes the accompanying drawings required for describing the embodiments or the prior art. Clearly, the accompanying drawings in the following description are merely some of the embodiments of the present invention. A person of ordinary skill in the art can further derive other drawings from these accompanying drawings without creative efforts.

DESCRIPTION OF EMBODIMENTS

The following clearly and comprehensively describes the technical solutions in the embodiments of the present invention with reference to the accompanying drawings in the embodiments of the present invention. Clearly, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
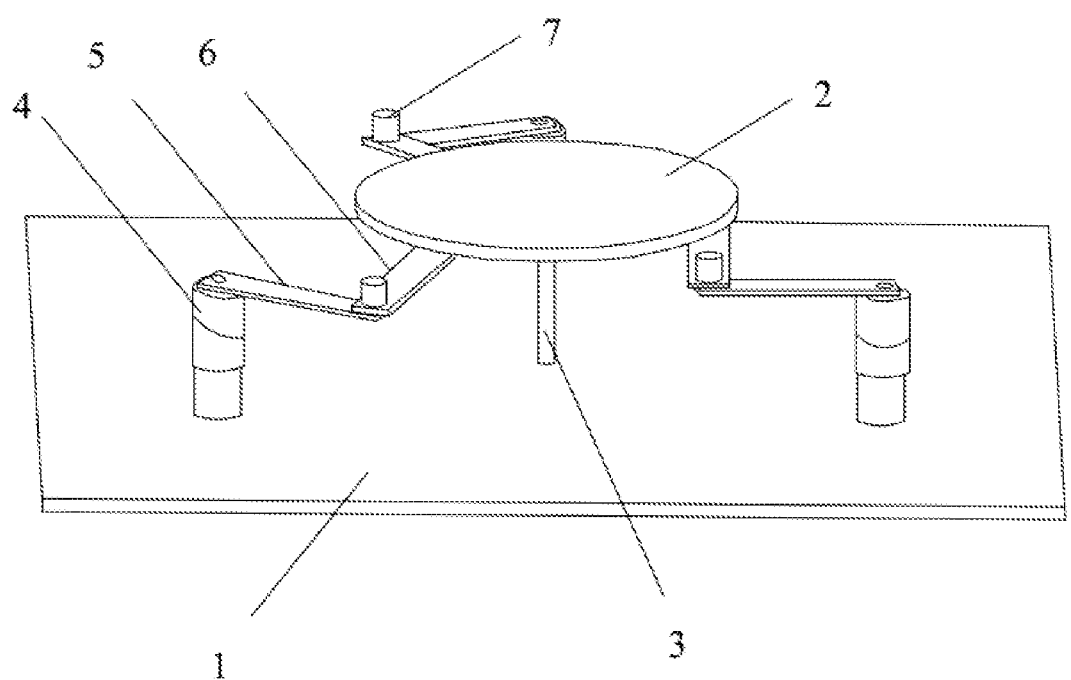
FIG. 1 is a schematic structural diagram of a three-degree-of-freedom parallel mechanism according to an embodiment of the present invention.
Figure 2:
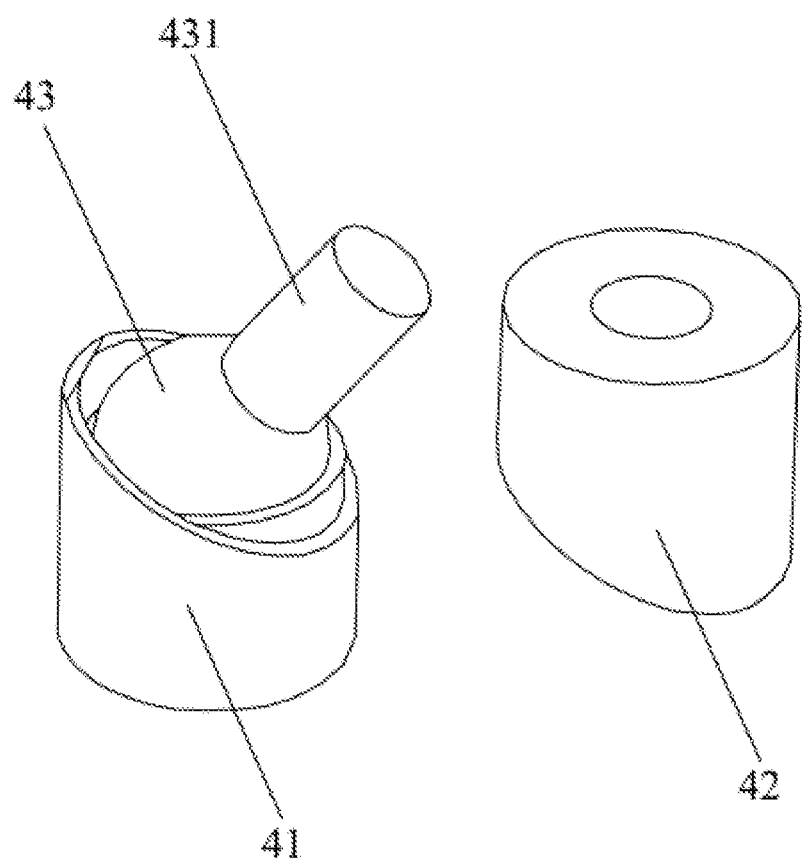
FIG. 2 is a schematic structural diagram of an axis-variable revolute pair according to an embodiment of the present invention.
Figure 3:
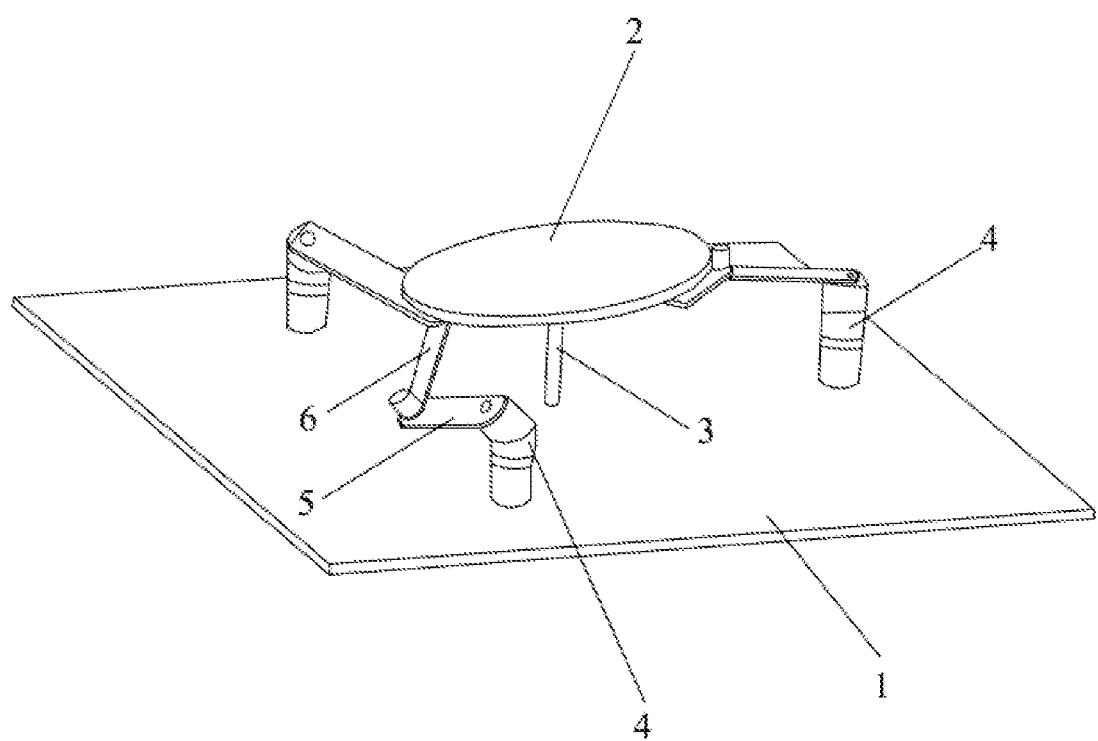
FIG. 3 is a schematic diagram of a usage state of a three-degree-of-freedom parallel mechanism according to an embodiment of the present invention.

As shown in FIG. 1 to FIG. 3, the embodiments provide a three-degree-of-freedom parallel mechanism. The parallel mechanism includes a fixed platform 1 and a movable platform 2, and the fixed platform 1 is connected to the movable platform 2 by using a first kinematic chain, a second kinematic chain, and a third kinematic chain that are connected in parallel. It is easy to understand that for each of the three kinematic chains, one end is connected to the movable platform 2, and the other end is connected to the fixed platform 1.

At least one of the first kinematic chain, the second kinematic chain, and the third kinematic chain is a flexible chain. The flexible chain includes a first connecting rod 5, a second connecting rod 6, and an axis-variable revolute pair 4. The axis-variable revolute pair 4 includes a fixed member 41, a movable member 42, and a spherical pair 43. One end of the fixed member 41 is fastened on the fixed platform 1, and the other end of the fixed member 41 fits and abuts against an inclined surface of the movable member 42. The spherical pair 43 is accommodated in the fixed member 41, and a spherical hinge connecting rod 431 of the spherical pair 43 penetrates the movable member 42. The first connecting rod 5 is rotatably connected to the spherical hinge connecting rod 431 and the second connecting rod 6, and the second connecting rod 6 is spherically hinged to the movable platform 2. Both the rotatable connection structure of the first connecting rod 5 and the spherical hinge connecting rod 431 and the rotatable connection structure of the first connecting rod 5 and the second connecting rod 6 are ordinary revolute pairs, and rotating shafts of the two rotatable connection structures are usually parallel to each other. The connection shaft of the first connecting rod 5 and the spherical hinge connecting rod 431 is an axis of the spherical hinge connecting rod 431. Preferably, when a direction of a hinge shaft of the spherical hinge connection structure of the second connecting rod 6 and the movable platform 2 is perpendicular to the movable platform 2, directions of the rotating shafts of the two rotatable connection structures corresponding to the first connecting rod 5 are also perpendicular to the movable platform 2. The fixed member 41 and the movable member 42 form a structure in which inclined surfaces fit each other. That is, there is an inclined surface at an end of the fixed member 41 that is away from the fixed platform 1, there is also an inclined surface at an end of the movable member 42 that is away from the first connecting rod 5, and the two inclined surfaces are adapted to fit each other. It is easy to understand that to facilitate freedom of movement of the three-degree-of-freedom parallel mechanism, both the two inclined surfaces are planar, and there is an angle between the fixed platform 1 and each of the two inclined surfaces. Preferably, both the fixed member 41 and the movable member 42 are hollow members, so that the spherical pair 43 can be accommodated in the fixed member 41. Specifically, as shown in FIG. 2, a ball socket of the spherical pair 43 is accommodated in the fixed member 41, a ball end of the spherical pair 43 fits the ball socket, and the spherical hinge connecting rod 431 is connected to the ball end, and penetrates an end of the movable member 42 that is away from the fixed member 41 from a hollow inner cavity of the movable member 42. Preferably, both the fixed member 41 and the movable member 42 are cylindrical members. In this case, the ball socket and the fixed member 41 are preferably disposed coaxially, and the spherical hinge connecting rod 431 and the movable member 42 are preferably disposed coaxially. Further preferably, a cylindrical structure is formed when axes of the fixed member 41 and the movable member 42 coincide.

When the first connecting rod 5 drives the spherical hinge connecting rod 431 to rotate, the inclined surface of the movable member 42 is limited to rotate on the inclined surface of the fixed member 41 due to the action of the inclined surface, and the axis of the spherical hinge connecting rod 431 changes in real time. An angle at which the axis changes is related to an inclination angle of the inclined surface. In comparison with a kinematic chain with an ordinary revolute pair structure, in the present invention, the axis-variable revolute pair is incorporated into the structure of the kinematic chain. This is favorable to transmission of force and torque of the kinematic chain and can effectively avoid singularities of the parallel mechanism.

In a preferred embodiment, as shown in FIG. 1 and FIG. 3, all of the first kinematic chain, the second kinematic chain, and the third kinematic chain are flexible chains, and connection points between the movable platform 2 and three second connecting rods 6 are annularly arranged on the movable platform 2. The three-degree-of-freedom parallel mechanism of the structure runs more stably and reliably.

Further preferably, as shown in FIG. 1 and FIG. 3, the three-degree-of-freedom parallel mechanism further includes an intermediate connecting rod 3. One end of the intermediate connecting rod 3 is fastened on the fixed platform 1, and the other end of the intermediate connecting rod 3 is spherically hinged to the movable platform 2. In other words, there are four kinematic chains between the movable platform 2 and the fixed platform 1. Preferably, the first kinematic chain, the second kinematic chain, and the third kinematic chain are disposed around the intermediate connecting rod 3 in the circumferential direction of the movable platform 2, and the movable platform 2 can rotate with three degrees of freedom around the center of a spherical hinge connected to the intermediate connecting rod 3. The three-degree-of-freedom parallel mechanism of the foregoing structure runs more stably and reliably. The three-degree-of-freedom parallel mechanism provided in this embodiment is a novel 3-RRRS/S three-degree-of-freedom parallel mechanism. The parallel mechanism has a simple structure and a movable platform 2 that moves stably and reliably, features high force/torque transmission performance and high dexterity, and can be applied to fields such as parallel kinematics machine tools, aeronautical simulation equipment, and medical equipment. In an embodiment, the movable platform 2 is a circular platform, and the center of the spherical hinge connected to the intermediate connecting rod 3 is preferably located on the central axis of the movable platform 2 (that is, perpendicular to the axis of the movable platform 2).

In a preferred embodiment, as shown in FIG. 1 and FIG. 3, each flexible chain is connected to a drive unit 7, and the drive unit 7 is connected to a corresponding first connecting rod 5 or second connecting rod 6. Under the action of the drive unit 7, a relative position between the first connecting rod 5 and the second connecting rod 6 and an axis of the corresponding axis-variable revolute pair 4 are changed, and further the movable platform 2 is driven to move. Preferably, the drive unit 7 can be a drive motor, and the drive motor drives the rotating shaft between the first connecting rod 5 and the second connecting rod 6 to rotate, to change positions of the first connecting rod 5 and the second connecting rod 6. In a feasible embodiment, the drive motor is a micro motor that can be installed on one of the connecting rods. The first kinematic chain, the second kinematic chain, and the third kinematic chain each use the structure of the flexible chain. In this case, a required rotation movement of the movable platform 2 can be implemented through collaboration of three drive units 7.

The foregoing descriptions are merely preferred embodiments of the present invention, and are not intended to limit the present invention. Any modification, equivalent replacement, improvement, or the like made within the spirit and principle of the present invention shall fall within the protection scope of the present invention.

What is claimed is:

1. A three-degree-of-freedom parallel mechanism, comprising a fixed platform and a movable platform, wherein the fixed platform is connected to the movable platform by using a first kinematic chain, a second kinematic chain, and a third kinematic chain that are connected in parallel, and at least one of the first kinematic chain, the second kinematic chain, and the third kinematic chain is a flexible chain; and
the flexible chain comprises a first connecting rod, a second connecting rod, and an axis-variable revolute pair, the axis-variable revolute pair comprises a fixed member, a movable member, and a spherical pair, one end of the fixed member is fastened on the fixed platform, another end of the fixed member fits and abuts against an inclined surface of the movable member, the spherical pair is accommodated in the fixed member, a spherical hinge connecting rod of the spherical pair penetrates the movable member, the first connecting rod is rotatably connected to the spherical hinge connecting rod and the second connecting rod, and the second connecting rod is spherically hinged to the movable platform.

2. The three-degree-of-freedom parallel mechanism according to claim 1, wherein all of the first kinematic chain, the second kinematic chain, and the third kinematic chain are flexible chains, and connection points between the movable platform and three second connecting rods are annularly arranged on the movable platform.

3. The three-degree-of-freedom parallel mechanism according to claim 1, further comprising an intermediate connecting rod, wherein one end of the intermediate connecting rod is fastened on the fixed platform, and another end of the intermediate connecting rod is spherically hinged to the movable platform.

4. The three-degree-of-freedom parallel mechanism according to claim 3, wherein the first kinematic chain, the second kinematic chain, and the third kinematic chain are disposed around the intermediate connecting rod in the circumferential direction of the movable platform.

5. The three-degree-of-freedom parallel mechanism according to claim 1, wherein each flexible chain is connected to a drive unit, and the drive unit is connected to a corresponding first connecting rod or second connecting rod.

6. The three-degree-of-freedom parallel mechanism according to claim 1, wherein a cylindrical structure is formed when axes of the fixed member and the movable member coincide.

* * * * *